United States Patent Office 3,148,218
Patented Sept. 8, 1964

3,148,218
SELECTIVE CONDENSATION OF n-BUTYRALDE-HYDE IN ADMIXTURE WITH ISOBUTYRALDE-HYDE
Robert A. Heimsch and William E. Weesner, Dayton, Ohio, assignors to Monsanto Company, a corporation of Delaware
No Drawing. Filed June 20, 1955, Ser. No. 516,763
1 Claim. (Cl. 260—601)

This invention relates to a novel method for condensing aldehydes. More specifically, the invention is directed to a method of preparing dehydrated aldols by the condensation and dehydration of alkanals in the presence of specific catalysts. It is an object of the invention to convert alkanals such as those produced by the oxo process from an olefin, carbon monoxide and hydrogen into more valuable, higher-molecular-weight compounds. Another object is the separation of (a) alkanals having at least two hydrogen atoms in an alpha position relative to the carbonyl group from (b) alkanals having less than two hydrogen atoms in a position alpha to the carbonyl group. In the case of four-carbon-atom alkanals such as may be produced from propylene as the starting olefin, such separation process may be employed with respect to n-butyraldehyde and isobutyraldehyde. It is, therefore, a further object of the invention to condense n-butyraldehyde selectively in the presence of isobutyraldehyde without condensing the latter. It is also an objective of the invention to improve the production of alkanals by a low pressure condensation following the high pressure carbonylation step of the oxo process.

It is also an objective of the invention to carry out an oxo process in which the separation of n-butyraldehyde by condensation and dehydration to 2-ethyl-2-hexenal leaves the isobutyraldehyde substantially unreacted and available after separation as a solvent for the reactants and the catalyst in the carbonylation step of the reaction.

It is known that the oxo reaction for the production of alkanals is non-selective in nature so that the reaction of propylene, for example, with carbon monoxide and hydrogen under the proper conditions yields as primary products n-butyraldehyde and isobutyraldehyde. Subsequent condensation of the said aldehydes by previously known methods, such as the alkali-catalyzed aldol reaction, without previous isolation of the individual components would result in the formation of condensation products derived from the individual compounds themselves as well as mixed condensation products of the two components. The alkali-catalyzed aldol condensation thus applied to the mixture of n-butyraldehyde and isobutyraldehyde could result in the production of 2-ethyl-3-hydroxyhexaldehyde; 2 - ethyl-3-hydroxy-4-methyl-pentaldehyde; 2,2-dimethyl-3 - hydroxyhexaldehyde; and 2,2,4 - trimethyl-3-hydroxy-pentaldehyde. Metals per se have also been used in condensations in heterogeneous catalytic systems but such processes are less efficient than the present catalytic method.

Mixtures, which result from the alkali-catalyzed aldol condensation as described above, have little value as chemical products because of the difficulty of separation. To overcome this difficulty would require an expensive series of preliminary fractionations of the close-boiling, isomeric primary aldehydes likewise resulting in lower yields.

It has now been found that the condensation of aldehydes obtained by various processes may be carried out to obtain the more desirable dehydrated aldols when the condensation is effected in the presence of specific compounds of metals as catalysts for the reaction. It has also been found that selective reaction of normal butyraldehyde relative to isobutyraldehyde may be obtained. More generally it is thus possible to accomplish a separation of alkanols having at least two hydrogen atoms in an alpha position relative to the carbonyl group from alkanals having less than two hydrogen atoms in a position alpha to the carbonyl group.

The nature of the selective catalytic action is not fully understood although a substantially complete separation is possible in the condensation of alkanals of the two types described above. Specific instances are the selective condensation of straight-chain aldehydes such as n-butyraldehyde in admixture with branched-chain aldehydes such as isobutyraldehyde.

In mixtures obtained by the oxo reaction from the respective olefins there is generally obtained a mixture of the two types of aldehydes described above; e.g., those having at least two hydrogen atoms in an alpha position relative to the carbonyl group and those having less than two hydrogen atoms in a position alpha to the carbonyl group.

The condensation is applicable to aldehydes having two or more carbon atoms. Thus, the process may be carried out with acetaldehyde, propionaldehyde, n-butyraldehyde, amylaldehydes, hexylaldehydes, heptylaldehydes, octylaldehydes, nonylaldehydes, decylaldehydes, undecylaldehydes, dodecylaldehydes, etc. The aldehydes employed may also be substituted such as phenylacetaldehyde, beta-phenylpropionaldehyde, beta-cyclohexylpropionaldehyde, beta-chlorobutyraldehyde, gamma chlorobutyraldehyde, beta-thenylpropionaldehyde and delta-furylvaleraldehyde.

The catalyst employed in the present invention for the condensation of alkanals either as single compounds or in admixture may be a metal salt of a compound selected from the group of copper, zinc, mercury, tin, iron, cobalt and nickel, lead, vanadium, antimony, molybdenum, and manganese; this group hereafter referred to as copper, etc. Examples may be molybdenum phosphate, tin γ-ethylcaproate, cobalt nitrate, mercury naphthenate, iron tallate, manganese γ-ethylcaproate, antimony nitrate, copper γ-ethylcaproate, cobalt tallate, nickel naphthenate, vanadium sulfate, zinc γ-ethylcaproate, lead stearate, nickel acetylacetonate, cobalt linoleate and other derivatives such as amines, quaternary ammonium compounds, and amine salts of the said metals.

The catalyst may be employed as a soluble or insoluble compound or as a mixture of compounds and may be introduced into the reaction zone as a suspension. However, it has been found that soluble catalysts are more easily employed and gave higher conversion in an industrial process, and are, therefore, preferred.

The catalyst may also be provided in the form of granules and fragments and may also be supported on powdered, pelletted, or granular inert carriers such as silica, pumice, alumina, kieselguhr and the like. When supported catalysts are employed, it is preferred to have an active metal content of about 0.10% to 25% but the proportion of the metal is not a critical variable in the present process. The concentration of the catalyst in the condensation mixture may also vary widely such as from 0.10% to 10% by weight of the active metal relative to the charge of the aldehyde present.

If a soluble catalyst is employed, the reaction may be conducted by dissolving the catalyst directly in the aldehyde. However, it is also possible to use other solvents such as water or various organic liquids. Thus, ethers, alcohols and aldehydes may be used for this purpose. A preferred embodiment is the employment of a by-product of the oxo reaction for the reaction medium. For example, in conducting the oxonation of propylene with carbon monoxide and hydrogen, the primary products are n-butyraldehyde and isobutyraldehyde. When such reaction mixture is subjected to the condensation process of the present invention, the n-butyraldehyde is selectively condensed to 2-ethyl-2-hexenal, leaving the isobutyraldehyde substantially unreacted. In the subsequent separation of the product 2-ethyl-2-hexenal, the isobutyraldehyde may be separated and subsequently reused as the reaction medium. The isobutyraldehyde may then be used as a solvent for a soluble catalyst such as cobalt alpha-ethylcaproate, or as the suspending medium for an insoluble catalyst such as cobalt oxide.

The condensation is carried out at temperatures above 70° C., preferably in the range of 70–200° C. The time and pressure are not critical; the pressure may be maintained at atmospheric, sub-atmospheric or super-atmospheric conditions.

*Example 1*

In order to show the selectivity of the present condensation a mixture of 15 g. of isobutyraldehlde and 100 g. of n-butyraldehyde are charged together with 28 g. of solid cobalt linoleate.

The above solution is heated at 100–160° C. for 30 minutes in a pressure bomb after which the entire bomb is quenched in ice. Distillation of the reaction products gives a recovery of 70.0% of the isobutyraldehyde and 18.2% of the n-butyraldehyde charged. The conversion to 2-ethyl-2-hexenal based on the n-butyraldehyde charged is 76.1% (93.1% yield), leaving a 6.7% residue.

*Example 2*

In order to determine whether any isobutyraldehyde condensed with n-butyraldehyde another condensation is carried out by charging 400 g. of n-butyraldehyde, 60 g. of isobutyraldehyde and 72 g. of 69.7% cobalt alpha-ethylcaproate in ether. The condensation is carried out for twelve minutes in a pressure bomb maintained at 100 to 150° C., after which the bomb is quenched in ice. Infrared analysis of the product indicates the absence of 2-ethyl-4-methyl-2-pentenal. It is, therefore, concluded that none of the isobutyraldehyde is condensed with the normal isomer, while the major portion of the n-butyraldehyde reacts to give the condensation product, 2-ethyl-2-hexenal.

*Example 3*

A mixture of 100 g. of n-butyraldehyde and 20 g. of a 59% solution of nickel alpha-ethylcaproate in ether is charged to a pressure bomb. The above reaction mixture is heated to a temperature of 100–150° C. After a 10-minute heating period the pressure bomb is quenched in ice. The liquid mixture is then distilled to obtain a 46.3% recovery of the n-butyraldehyde. The conversion to 2-ethyl-2-hexenal is 51.0% corresponding to a yield of 94.8%.

*Example 4*

The use of iron γ-ethylcaproate as a catalyst for the condensation is conducted with a mixture of aldehydes similar to that of Example 1 at a temperature of 100–150° C. for 10 minutes to obtain a yield of 82.5% of 2-ethyl-2-hexenal from the n-butyraldehyde. It is again found that there is substantially no condensation of the isobutyraldehyde with the normal isomer.

*Example 5*

In order to show the use of an elemental metal catalyst, a condensation of n-butyraldehyde at atmospheric pressure is conducted by charging 50 g. of the aldehyde together with 2.0 g. of iron powder to a flask which is heated under reflux for 3.5 hours during which time the temperature rises from 75 to 76° C. It is found that no reaction takes place.

A similar experiment conducted with cobalt alpha-ethyl-caproate at atmospheric pressure shows a yield of 2-ethyl-2-hexenal of 77%.

*Example 6*

Cobalt naphthenate is utilized as a catalyst in a condensation employing a mixture of 15 g. of isobutyraldehyde and 100 g. of n-butyraldehyde. The catalyst is employed in a concentration of about 25 g. The reaction mixture is heated in a bomb to a temperature of 100–160° C. for 30 minutes after which the bomb is quenched in ice. The reaction products obtained show a substantial conversion to 2-ethyl-2-hexenal with substantially no reaction of the isobutyraldehyde with n-butyraldehyde.

*Example 7*

A mixture of aldehydes similar to that of Example 6 is charged together with a catalyst composed of cobalt tallate obtained as salts of acids derived from tall oil. The reaction is conducted similarly to the method of Example 6 and yields a product essentially composed only of 2-ethyl-2-hexenal.

*Example 8*

This example demonstrates the use of other aldehydes in the condensation. Acetaldehyde is heated in a pressure bomb at 90–110° C. in the presence of cobalt alpha-ethylcaproate to give a good yield of crotonaldehyde. The product is identified from its 2,4-dinitrophenylhydrazone.

n-Decylaldehyde is similarly condensed at 100 to 150° 124 to 127° C./0.7 mm. $n_D^{25}$ 1.4582, $D_{25}^{25}$ 0.846.
124 to 127° C./0.7 mm., $n_D^{25}$ 1.4582, $_{D25}^{25}$ 0.846.

*Example 9*

The purpose of this example is to show that the condensation of the n-butyraldehyde does not take place during the oxonation step. A pressure bomb is charged with 300 ml. of ether, 45 g. of a 70% solution of cobalt carbonyl in ether (in the absence of any carboxylic acid) and 94 g. of a mixture containing 95% propylene-5% propane. The bomb is pressurized with an equimolar mixture of carbon monoxide and hydrogen and is then heated at 100 to 125° C. for 20 minutes at 7400 to 11,500 p.s.i. Distillation of the reaction product indicates a conversion of about 75% to isobutyraldehyde and n-butyraldehyde without the formation of any appreciable 2-ethyl-2-hexenal.

*Example 10*

Copper alpha-ethylcaproate is used as the catalyst in a run in which 100 g. of n-butyraldehyde is charged with 35.6 g. of a 44.5% solution of cupric alpha-ethylcaproate in ether. The condensation is found to proceed to completion in a period of 10 minutes at 110–150° C. Distillation of the reaction products show a 84.5% yield of 2 - ethyl - 2 - hexenal based upon the n-butyraldehyde charged.

*Example 11*

Manganese alpha-ethylcaproate is charged as a catalyst in the amount of 36.0 g. of a 52% ether solution. The reactants employed are 100 g. of n-butyraldehyde. It is found that there is a 75.5% yield of the 8-carbon-atom aldehyde.

*Example 12*

A zinc catalyst is employed in the amount of 17.1 g. of a 80.7% solution of zinc alpha-ethylcaproate in ether. When this catalyst is tested in a condensation run with 100 g. of n-butyraldehyde, a 65.8% yield of the 2-ethyl-2-hexenal is obtained.

*Example 13*

Tin alpha-ethylcaproate is charged to a condensation run in the amount of 17.8 g. of a 50% solution of the tin salt in ether. Condensation of n-butyraldehyde is accomplished in substantial proportion yielding the 8-carbon-atom aldehyde.

In general the catalysts contemplated in the present invention are salts of copper, zinc, mercury, tin, lead, vanadium, antimony, molybdenum, manganese, cobalt, iron and nickel. It is preferred that soluble compounds be employed but insoluble compounds may also be utilized such as in the form of a slurry or colloidal mixture which may be charged to the reactor.

What is claimed is:

A process for the selective condensation of n-butyraldehyde in liquid admixture with isobutyraldehyde which comprises heating the said mixture to a temperature of from 70–200° C. in the presence of cobalt alpha-ethylcaproate.

References Cited in the file of this patent

UNITED STATES PATENTS

| | | |
|---|---|---|
| 2,245,582 | Gallagher et al. | July 17, 1941 |
| 2,517,006 | Maclean | Aug. 1, 1950 |
| 2,564,104 | Gresham et al. | Aug. 14, 1951 |
| 2,587,576 | Field et al. | Mar. 4, 1952 |
| 2,595,763 | Carlson et al. | May 6, 1952 |
| 2,820,067 | Mertzweiller et al. | Jan. 14, 1958 |

FOREIGN PATENTS

| | | |
|---|---|---|
| 478,621 | Canada | Nov. 13, 1951 |

UNITED STATES PATENT OFFICE
CERTIFICATE OF CORRECTION

Patent No. 3,148,218                                September 8, 1964

Robert A. Heimsch et al.

It is hereby certified that error appears in the above numbered patent requiring correction and that the said Letters Patent should read as corrected below.

Column 2, line 2, for "alkanols" read -- alkanals --; column 3, line 17, for "isobutyraldehlde" read -- isobutyraldehyde --; column 4, line 23, strike out "124 to 127° C./0.7 mm. $n_D^{25}$ 1.4582, $D_{25}^{25}$ 0.846." and insert instead -- to give an unsaturated 20-carbon-atom aldehyde, B.P. --.

Signed and sealed this 12th day of April 1966.

(SEAL)
Attest:

ERNEST W. SWIDER                              EDWARD J. BRENNER
Attesting Officer                                   Commissioner of Patents